(12) United States Patent
Archibald et al.

(10) Patent No.: US 6,895,335 B2
(45) Date of Patent: May 17, 2005

(54) LOCATING A SOURCE OF EMANATIONS

(75) Inventors: Ian George Archibald, Chester (GB); Stephen John Gillespie, Chester (GB); Steven Arthur Richardson, Chester (GB); William Joseph Senior Hirst, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/623,248

(22) Filed: Jul. 18, 2003

(65) Prior Publication Data

US 2004/0064254 A1 Apr. 1, 2004

(30) Foreign Application Priority Data

Jul. 24, 2002 (EP) ............................................ 02255174

(51) Int. Cl.[7] ................................................ G01V 9/00

(52) U.S. Cl. ............................................ 702/2; 702/13

(58) Field of Search ........................... 702/2, 5, 12, 13; 703/9, 10

(56) References Cited

U.S. PATENT DOCUMENTS

| | | | | |
|---|---|---|---|---|
| 3,734,489 A | | 5/1973 | Milly | 73/23 |
| 5,604,299 A | * | 2/1997 | Cobb | 73/31.02 |
| 5,724,255 A | * | 3/1998 | Smith et al. | 700/266 |
| 5,832,411 A | * | 11/1998 | Schatzmann et al. | 702/23 |
| 5,892,690 A | * | 4/1999 | Boatman et al. | 700/276 |
| 6,539,311 B1 | * | 3/2003 | Berger | 702/23 |

FOREIGN PATENT DOCUMENTS

GB 997 877 7/1965

OTHER PUBLICATIONS

"Process Site Quantification and Location from Optical Remote Sensing Measurements," by R. J. Wilkinson, I. G. Archibald, E. W. Kuipers, S. A. Reid, and J. I. L. Hughes, Proc. SPIE–Int. Soc. Opt. Eng.; 1996, vol. 2883, pp. 355–364.

A Field–Portable, Laser–Diode Spectrometer for the Ultra–Sensitive Detection of Hydrdocarbon Gases, by Graham Gibson, Stephen D. Mond and Miles Padgett, Journal of Modern Optics, 2002, vol. 49, No. 5/6, pp. 769–776.

A. Jeremic et al., "Landmine Detection and Localization Using Chemical Sensor Array Processing," (2000), pp. 1295–1305.

European Patent Office, European Search Report dated Mar. 2003.

"Airborne Eddy Corelation Gas Flux Measurements: Design Criteria for Optical Techniques," by J.A. Ritter, G.W. Sachse, and B.E. Anderson, SPIE vol. 1715, Optical Methods in Atmospheric Chemisrty (1992), pp. 404–412.

* cited by examiner

*Primary Examiner*—Donald McElheny, Jr.

(57) ABSTRACT

A method of determining the position and emission rate of at least one source of emanations into an intervening medium, which method comprises measuring the concentration of the emanations in the intervening medium at selected measurement locations to obtain observed data, and measuring the velocity of the intervening medium; postulating a dispersion model; postulating a source model containing source parameters, such as the position(s) of assumed source(s) and assumed emission rate(s); calculating with the dispersion model for a postulated source model the concentration that would arise at the measurement location (s) to obtain synthetic data for the postulated source model; comparing the synthetic data with the observed data to obtain the source model that gives the closest fit; and outputting the position and emission rate of the at least one source assumed in the source model that gives the closest fit.

4 Claims, 1 Drawing Sheet

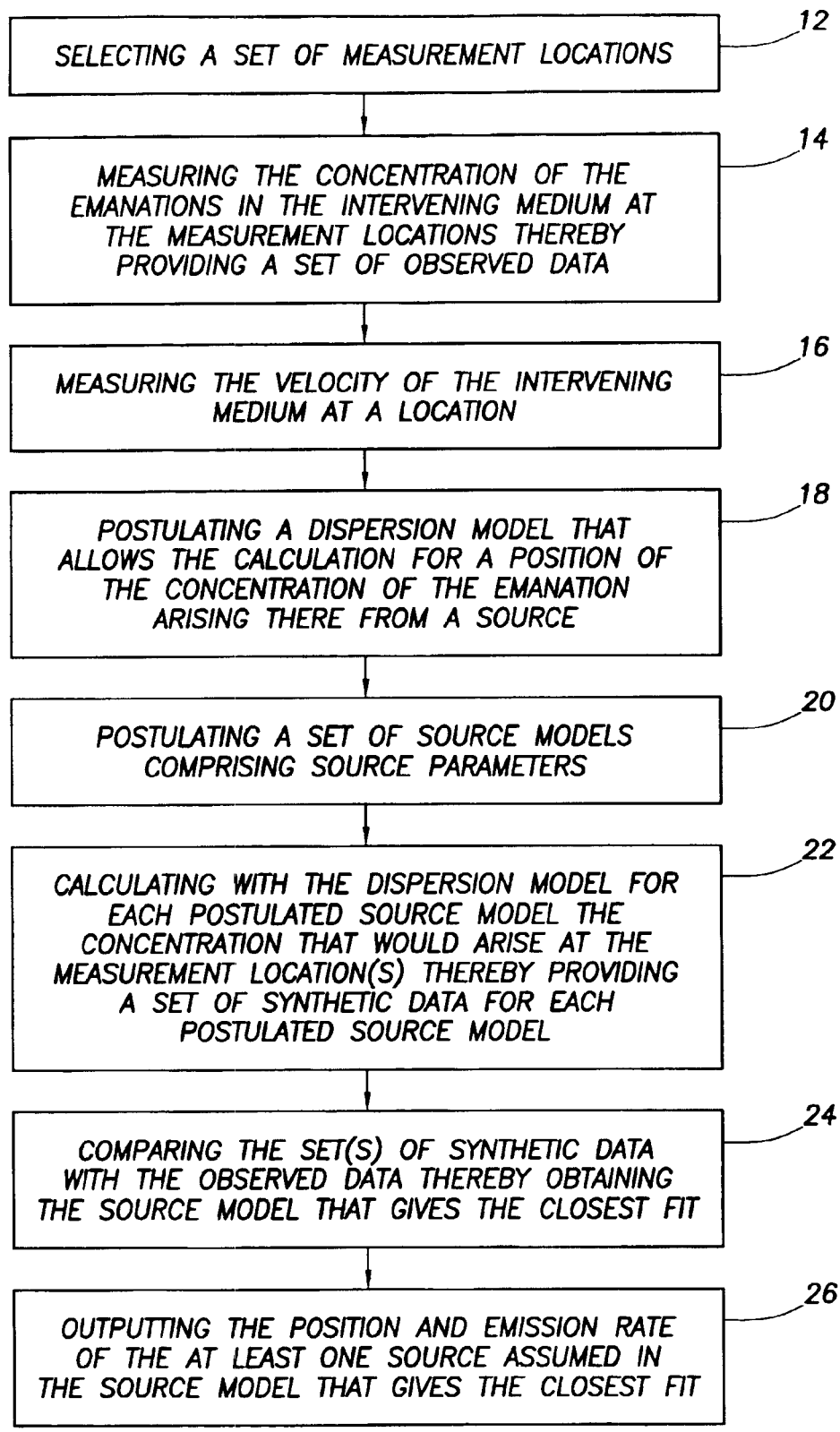
FIGURE

LOCATING A SOURCE OF EMANATIONS

FIELD OF THE INVENTION

The present invention relates to a method of determining the position and emission rate of at least one source of emanations into an intervening medium.

BACKGROUND OF THE INVENTION

The article Wilkinson et al, 'Process site emission quantification and location from optical remote sensing measurements' Proc. SPIE-Int. Soc. Opt. Eng; 1996, Vol. 2883, pages 355–364 discloses such a method.

Such method contains the steps of:
(a) selecting a set of measurement locations;
(b) measuring the concentrations of the emanations in the intervening medium at the measurement locations to obtain a set of observed data;
(c) measuring the velocity of the intervening medium at a location;
(d) postulating a dispersion model that allows the calculation for a position of the concentration of the emanation arising there from a source;
(e) postulating a set of source models consisting of source parameters, such as the position(s) of assumed source(s), and assumed emission rate(s);
(f) calculating with the dispersion model for each postulated source model the concentration that would arise at the measurement location(s) to obtain a set of synthetic data for each postulated source model;
(g) comparing the set(s) of synthetic data with the observed data to select the source model that gives the closest fit; and
(h) outputting the position and emission rate of the at least one source assumed in the source model that gives the closest fit.

The measurements carried out to obtain the set of observed data were done using open-path measurements. In the open-path measurements, the concentration of emanations is measured over a path having a length of up to 500 meters by means of a sensor to yield a path-integrated gas concentration measurement.

This method was applied on a refinery to locate gaseous leaks and their associated mass release rates (emission rates). The relatively low concentrations typically resulting in the atmosphere from such leaks require long measurement paths for the influence of the sought gas or gases to be measurable. However, because the concentration is detected along the full length of a line, the likelihood: that emanations from a source would be detected is relatively high.

A disadvantage of the known method is that it is laborious to set up the devices needed to carry out the open-path measurements.

SUMMARY OF THE INVENTION

A method of determining the position and emission rate of at least one source of emanations into an intervening medium is provided, which method comprises:
(a) selecting a set of measurement locations;
(b) measuring the concentration of the emanations in the intervening medium at the measurement locations thereby providing a set of observed data;
(c) measuring the velocity of the intervening medium at a location;
(d) postulating a dispersion model that allows the calculation for a position of the concentration of the emanation arising there from a source;
(e) postulating a set of source models comprising source parameters;
(f) calculating with the dispersion model for each postulated source model the concentration that would arise at the measurement location(s) thereby providing a set of synthetic data for each postulated source model;
(g) comparing the set(s) of synthetic data with the observed data thereby obtaining the source model that gives the closest fit; and
(h) outputting the position and emission rate of the at least one source assumed in the source model that gives the closest fit,
wherein the concentrations of the emanations are measured by point measurements using an ultra-sensitive detector.

Further provided is a method of remotely determining the position of a hydrocarbon reservoir located in an earth formation, which method comprises:
(a) selecting a set of measurement locations;
(b) measuring the concentration of a selected component in the atmosphere at the measurement locations thereby providing a set of observed data;
(c) measuring the wind velocity at a location;
(d) postulating a dispersion model that allows the calculation for a position of the concentration of the selected component arising there from a source;
(e) postulating a set of source models comprising source parameters;
(f) calculating with the dispersion model for each postulated source model the concentration that would arise at the measurement location(s) thereby providing a set of synthetic data for each postulated source model;
(g) comparing the set(s) of synthetic data with the observed data thereby obtaining the source model that gives the closest fit; and
(h) outputting the position and emission rate of the at least one source assumed in the source model that gives the closest fit to obtain a representation of the position of the hydrocarbon reservoir,
wherein the concentrations of the emanations are measured by point measurements using an ultra-sensitive detector.

BRIEF DESCRIPTION OF THE DRAWINGS

FIGURE is a flow chart of an example embodiment of the present invention.

DETAILED DESCRIPTION OF THE INVENTION

To overcome the above-mentioned disadvantage, provided is a method of determining the position and emission rate of at least one source of emanations into an intervening medium according to the present invention containing the steps of:
(a) selecting a set of measurement locations;
(b) measuring the concentration of the emanations in the intervening medium at the measurement locations to obtain a set of observed data;
(c) measuring the velocity of the intervening medium at a location;
(d) postulating a dispersion model that allows the calculation for a position of the concentration of the emanation arising there from a source;
(e) postulating a set of source models consisting of source parameters, such as the position(s) of assumed source(s) and assumed emission rate(s);
(f) calculating with the dispersion model for each postulated source model the concentration that would arise at the measurement location(s) to obtain a set of synthetic data for each postulated source model;

(g) comparing the set(s) of synthetic data with the observed data to obtain the source model that gives the closest fit; and (h) outputting the position and emission rate of the at least one source assumed in the source model that gives the closest fit, wherein the concentrations of the emanations are measured by point measurements using an ultra-sensitive detector effective to measure concentrations of the emanations (with an appropriate response time).

The method of the present invention can suitably be used for determining the position and emission rate of leaks on a refinery, chemical plant or similarly large and complicated areas of processing activities and their related emissions.

An area of application that currently attracts attention is hydrocarbon prospecting, or locating underground hydrocarbon reservoirs. Already in the nineteen sixties it was proposed to use measurements of concentrations of hydrocarbon gases escaping through the overburden to determine the position of an underground hydrocarbon reservoir. Examples are given in British patent specification No. 997 877 and U.S. Pat. No. 3,734,489. Basically the methods disclosed in these publications relied on physically traversing a line along which the concentration increased until eventually arriving at the source of the emanation, as indicated by the concentration measurements being greatest at that location. These methods entail considerable effort and for many regions of interest they are impractical to execute.

The present invention further provides a method of remotely determining the position of a hydrocarbon reservoir located in an earth formation, which method contains:

(a) selecting a set of measurement locations;

(b) measuring the concentration of a selected component in the atmosphere at the measurement locations to obtain a set of observed data;

(c) measuring the wind velocity at a location;

(d) postulating a dispersion model that allows the calculation for a position of the concentration of the selected component arising there from a source;

(e) postulating a set of source models consisting of source parameters, such as the position(s) of assumed source(s) and assumed emission rate(s);

(f) calculating with the dispersion model for each postulated source model the concentration that would arise at the measurement location(s) to obtain a set of synthetic data for each postulated source model;

(g) comparing the set(s) of synthetic data with the observed data to obtain the source model that gives the closest fit; and (h) outputting the position and emission rate of the at least one source assumed in the source model that gives the closest fit to obtain a representation of the position of the hydrocarbon reservoir, wherein the concentrations of the emanations are measured by point measurements using an ultra-sensitive detector effective to measure concentrations of the emanations (with an appropriate response time).

Applicant had now found that point measurements using an ultra-sensitive detector with an appropriate response time can be successfully used to replace the open-path measurements.

An advantage of the method according to the present invention is that it allows measuring at a relatively large distance away from the source (order of magnitude of kilometres). This constitutes the range from which the source location may be remotely determined without the need for a closer approach. And, because the detector has an appropriate response time, rapidly varying fluctuations in the concentration can be detected as well. A further advantage is that because a single instrument is used, it can easily be relocated to a position that is judged to be more advantageous in the light of the measurements and analysis previously obtained.

An ultra-sensitive detector is a detector that has a sensitivity sufficient to register the emanations from a source, at a predetermined distance from the source in the direction of flow of the intervening medium. If the intervening medium is the atmosphere, in the direction of flow would be downwind.

The appropriate response time is suitably comparable to or less than the fluctuation-time of the concentration. Suitably, the response time is less than 10 seconds and more suitably less than 1 second. The response time is the time it takes the detector to reach a pre-determined fraction, for example 90%, of a step change in the measured quantity.

A suitable detector for this specific application is described in the article 'A field-portable, laser-diode spectrometer for the ultra-sensitive detection of hydrocarbon gases', by Gibson et al, Journal of Modern Optics, 2002, vol. 49, No. 5/6, pages 769–776. The known detector has a lower detection level of less than 100 parts per trillion, or better for the particular emanating component.

In order to obtain sufficient information per measurement point, the measurement time is suitably comparable to the time it takes to for the emanation from the source to reach the measurement point. In case there are more sources, the measurement time is suitably comparable to the time it takes for the emanation from the farthest source to reach the measurement point.

In the method of the invention a dispersion model is used. An example of the dispersion model is the Gaussian plume model as described in the Wilkinson article.

The dispersion model yields the point concentration of the emanation at a measurement point as a function of the yet unknown source location(s), emission rate(s), and velocity of the intervening medium. The velocity is a vector quantity having a magnitude (speed) and a direction. In addition, the intensity of turbulence in the intervening medium is determined, and is included in the dispersion model as well.

In order to find the location(s) and the emanation rate(s) from the source(s), a process of inversion must be carried out.

According to the Wilkinson article there are many inversion processes, and in the article one of these is described in more detail.

The inversion techniques have three steps in common. The first step is postulating a set of source models containing source parameters, such as the position(s) of assumed source (s) and assumed emission rate(s).

The second step is calculating with the dispersion model for each postulated source model the concentration that would arise at the measurement location(s) to obtain a set of synthetic data for each postulated source model.

The third step is comparing the set(s) of synthetic data with the observed data to obtain the source model that gives the closest fit.

One method of comparing the synthetic data with the observed data is based on Bayesian statistical inference, see the Wilkinson article. Another is based on a generalized linear least squares inversion method. In this method a set of parameters of a source model is estimated such that the difference between the observed data and the synthetic data is minimized based on a specific norm. The synthetic data are calculated with the dispersion model.

The last step of the methods of the invention is outputting the result of the comparison, in the form of the position and the emission rate of the at least one source assumed in the source model that gives the closest fit. The output can be in the form of a contour map, or in a table with coordinates of the source or sources with the emission rates.

The invention is not only applicable to a gaseous component emanating into a gaseous intervening medium, the invention can as well be applied to a solid, liquid or gaseous component emanating into a liquid or gaseous intervening medium.

In principle the method according to the invention is applicable to any mineral prospecting requirement where a suitable volatile component can be identified and appropriately detected. A further application of the method of the present invention is the detection and location of mines by sensing of a suitably chosen volatile component of the mine.

The flow chart illustrated in the FIGURE is initiated in block 12 with selecting a set of measurement locations. The flow chart then proceeds to block 14 with measuring the concentration of the emanations in the intervening medium at the measurement locations thereby providing a set of observed data. The flow chart then proceeds to block 16 with measuring the velocity of the intervening medium at a location. The flow chart then proceeds to block 18 with postulating a dispersion model that allows the calculation for a position of the concentration of the emanation arising there from a source. The flow chart then proceeds to block 20 with postulating a set of source models comprising source parameters. The flow chart then proceeds to block 22 with calculating with the dispersion model for each postulated source model the concentration that would arise at the measurement location(s) thereby providing a set of synthetic data for each postulated source model. The flow chart then proceeds to block 24 with comparing the set(s) of synthetic data with the observed data thereby obtaining the source model that gives the closest fit. The flow chart then proceeds to block 26 with outputting the position and emission rate of the at least one source assumed in the source model that gives the closest fit.

We claim:

1. A method of determining the position and emission rate of at least one source of emanations into an intervening medium, which method comprises:
   (a) selecting a set of measurement locations;
   (b) measuring the concentration of the emanations in the intervening medium at the measurement locations thereby providing a set of observed data;
   (c) measuring the velocity of the intervening medium at a location;
   (d) postulating a dispersion model that allows the calculation for a position of the concentration of the emanation arising there from a source;
   (e) postulating a set of source models comprising source parameters;
   (f) calculating with the dispersion model for each postulated source model the concentration that would arise at the measurement location(s) thereby providing a set of synthetic data for each postulated source model;
   (g) comparing the set(s) of synthetic-data with the observed data thereby obtaining the source model that gives the closest fit; and
   (h) outputting the position and emission rate of the at least one source assumed in the source model that gives the closest fit,
wherein the concentrations of the emanations are measured by point measurements using an ultra-sensitive detector.

2. The method of claim 1 wherein the source parameters comprise the position(s) of assumed source(s) and assumed emission rate(s).

3. A method of remotely determining the position of a hydrocarbon reservoir located in an earth formation, which method comprises:
   (a) selecting a set of measurement locations;
   (b) measuring the concentration of a selected component in the atmosphere at the measurement locations thereby providing a set of observed data;
   (c) measuring the wind velocity at a location;
   (d) postulating a dispersion model that allows the calculation for a position of the concentration of the selected component arising there from a source;
   (e) postulating a set of source models comprising source parameters;
   (f) calculating with the dispersion model for each postulated source model the concentration that would arise at the measurement location(s) thereby providing a set of synthetic data for each postulated source model;
   (g) comparing the set(s) of synthetic data with the observed data thereby obtaining the source model that gives the closest fit; and
   (h) outputting the position and emission rate of the at least one source assumed in the source model that gives the closest fit to obtain a representation of the position of the hydrocarbon reservoir,
wherein the concentrations of the emanations are measured by point measurements using an ultra-sensitive detector.

4. The method of claim 3 wherein the source parameters comprise the position(s) of assumed source(s) and assumed emission rate(s).

* * * * *